United States Patent
Fu et al.

(10) Patent No.: US 7,233,883 B2
(45) Date of Patent: Jun. 19, 2007

(54) MONITORING SYSTEM FOR FUEL CELL STACK

(75) Inventors: Mingzhu Fu, Shanghai (CN); Liqing Hu, Shanghai (CN)

(73) Assignee: Shen-Li High Tech Co., Ltd. (Shanghai), Shanghai (CN)

( * ) Notice: Subject to any disclaimer, the term of this patent is extended or adjusted under 35 U.S.C. 154(b) by 61 days.

(21) Appl. No.: 11/155,797

(22) Filed: Jun. 16, 2005

(65) Prior Publication Data
US 2006/0284591 A1    Dec. 21, 2006

(51) Int. Cl.
*G06F 9/315* (2006.01)

(52) U.S. Cl. ............ 702/188; 702/190; 702/193; 702/198

(58) Field of Classification Search .......... 702/35, 702/63, 64, 68, 130, 179, 183, 188, 193, 702/190, 198; 320/116; 324/430; 701/33
See application file for complete search history.

(56) References Cited

U.S. PATENT DOCUMENTS 6,591,199 B2 *  7/2003  Tremblay et al. ............ 702/35
6,915,220 B2 *  7/2005  Cardinal et al. ............. 702/63
2006/0152224 A1 *  7/2006  Kim et al. .................. 324/430

OTHER PUBLICATIONS

Cena et al., A Multistage Hierarchical Distributed Arbitration Technique for Priority-Based Real-Time Communication Systems, Sep. 13, 2002, IEEE, vol. 49, No. 6, pp. 1227-1239.*

* cited by examiner

*Primary Examiner*—Marc S. Hoff
*Assistant Examiner*—Felix Suarez
(74) *Attorney, Agent, or Firm*—Raymond Y. Chan; David and Raymond Patent Group

(57) ABSTRACT

A monitoring system includes a plurality of monitoring devices adjacently provided to a group of integrated fuel cell stacks for measuring a voltage of the fuel cell units. Each of the monitoring devices includes a plurality of monitoring sensors adapted for electrically connecting to a predetermined set of fuel cell units and a MCU (Micro-Chip-Unit) for sequentially and circularly switching each two neighboring monitoring sensors for reading the voltage of each respective fuel cell. A CAN bus is provided for electrically and collectively interconnecting the monitoring devices with a central operator which is arranged in such a manner that when said voltage of the respective fuel cell unit exceeds a safety range, the central operator generates an alert signal for indicating an abnormal operation of the respective fuel cell.

2 Claims, 5 Drawing Sheets

MONITORING SYSTEM FOR FUEL CELL STACK

BACKGROUND OF THE PRESENT INVENTION

1. Field of Invention

The present invention relates to fuel cells, and more particularly to a monitoring system for fuel cell stack by monitoring the output voltage of each cell unit of the fuel cell stack to ensure the fuel cell stack working under an optimum condition.

2. Description of Related Arts

Electrochemical fuel cell is a kind of electrochemical energy conversion device which is capable of converting the hydrogen and oxidant into electrical energy. The core component of such device is the membrane electrode assembly (MEA). The MEA comprises a proton exchange membrane sandwiched by two porous sheets made of conductive material such as carbon tissue. Catalyst like metal platinum powder, adapted for facilitating the electrochemical reaction, are evenly and granularly provided on two carbon tissue sheets to form two catalytic interfaces. Furthermore, electrically conductible members are provided on two sides of the MEA to form a cathode and an anode in such a manner that electrons generated due to the electrochemical reaction are capable of being lead out through an electrical circuit.

The anode of the MEA is supplied with fuel, such as hydrogen, for initiating the electrochemical reaction. The fuel is forced through the porous and diffused carbon tissue sheet, and loses electrons to form positive ions on the catalytic interface due to the electrochemical reaction. The positive ions are capable of transferably penetrating the proton exchange membrane to reach the cathode. On the other hand, an oxidant-containing gas, such as oxygen and air, is supplied to the cathode of the MEA, wherein the oxidant-containing gas penetrates the porous and diffused carbon tissue sheet to generate negative ions due to the electrochemical reaction occurred on the catalytic interface. Finally, the positive ions transferred from the anode meets the negative ions to form reaction product.

The fuel cells employ hydrogen as the fuel and oxygen containing air (or pure oxygen) as the oxidant. The fuel hydrogen forms hydrogen positive ions (protons) at the anode portion due to the electrochemical reaction. The proton exchange membrane is capable of facilitating the hydrogen positive ions to migrate from the anode to the cathode. In addition, the proton exchange member also separates the hydrogen gas flow and the oxygen gas flow to prevent the mixture of hydrogen and oxygen as well as the explosive reaction therefor.

Oxygen obtains electrons from the catalytic interface to form negative ions at the cathode portion of the fuel cell due to the electrochemical reaction. The negative ions reacts with the hydrogen positive ions transferred from the anode portion to form reaction water product. In the fuel cells which utilize the hydrogen as the fuel and oxygen containing air as oxidant, the electrochemical reaction can be expressed by the following formula:

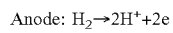
Anode: $H_2 \rightarrow 2H^+ + 2e$

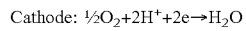
Cathode: $\frac{1}{2}O_2 + 2H^+ + 2e \rightarrow H_2O$

In the typical proton exchanging membrane fuel cell system, the MEA is disposed between two electrically conductible electrode plates wherein the contacting interface of each electrode plate defines at least one flowing channel. The flowing channel could be embodied by conventional mechanical method such as pressure casting, punching, and mechanical milling. The electrode plate could be embodied as metal electrode plate or graphite electrode plate. So the flowing channels provided on the electrode plate are capable of respectively directing fuel and oxidant into the anode portion and the cathode portion positioned on opposite sides of the MEA. For a single fuel cell structure, only one MEA is provided and disposed between an anode plate and a cathode plate. Here, the anode plate and the cathode plate not only are embodied as current-collecting device, but also as a supporting device for securely holding the MEA. The flowing channels provided on the electrode plates are capable of delivering fuel and oxidant to the catalytic interfaces of the anode and cathode, and removing the water discharged due to the electrochemical reaction of fuel cell.

To increase the overall power output of the proton exchanging membrane fuel cell, two or more fuel cells are electrically connected in series in a stacked manner or a successive manner to form a fuel cell stack. In such stacked series manner, each electrode plate provides flowing channels on opposite side of plate respectively wherein one side of the electrode plate is applied as an anode plate contacting with the anode interface of a MEA, while another side of the electrode plate is applied as a cathode plate contacting with the cathode interface of an adjacent MEA. That is to say, one side of such electrode plate serve as an anode plate for one fuel cell unit and the other side of plate serve as a cathode plate for the adjacent cell. This kind of structure is called bipolar plate. Conclusively, the fuel cell stack comprises a plurality of fuel cell units electrically connected with each other, and a pair of end plates disposed at two ends of such stack for securing the plurality of fuel cell units in position.

It is well known that fuel cell stack is used as power system for propelling vehicles and vessels, and for operating other electrically operated machines such as portable generators.

To support such powerful operator, a plurality of individual fuel cell units, commonly hundreds or thousands of fuel cell unit, is interconnected in series manner. As a result, a monitoring system is very important for monitoring the voltage output of each single fuel cell unit in order to prevent abnormal operation, such as overcurrent or excess working temperature of the fuel cell stack.

Accordingly, the overall output voltage of the fuel cell stack is determined by the accumulation of the outputs of the individual fuel cells electrically connected in a series manner. Therefore, when one of the individual fuel cells fails to operate, the overall performance of the fuel cell stack would be downgraded. In other words, it is crucial to monitor the performance of individual cell to ensure the overall performance of the fuel cell stack in good shape. Especially, when an electrode is disruptive, the voltage output of such electrode will reach an abnormal value, such as a value close to zero, or even a negative value. In contrary, the voltage output value of a normal fuel cell unit should be within a range between 0.5–1.2V. And more importantly, the extended service of such abnormal fuel cell unit would cause severe consequences. Therefore, it is necessary to monitor every single fuel cell unit of a fuel cell stack that, whenever certain fuel cell units monitored indicated an abnormal voltage value, the controlling system of such fuel cell stack would be able to provide alert or alarm signals and to shut down the whole system.

Shanghai Shenli Co. introduced an innovative device and method for monitoring voltage of individual fuel cell unit of a fuel cell stack, Chinese Patent No. 02136838.4. According to Shenli's invention, the live voltage output of each fuel cell unit could be directly measured and that once an abnormal voltage is detected, an alerter is provided for initiating an order for protecting the fuel cell stack.

Referring to the FIG. 1, the conventional monitoring device comprises a MCU (micro chip unit) processor which has an A/D converter and a plurality of switches, and a plurality of measuring lines extended from individual fuel cell unit of the fuel cell stack to electrically couple with the plurality of switches respectively, wherein each of the measuring lines is electrically connected to the A/D converter via a decoding matrix, such that a voltage signal is sent out from each of the measuring lines to the MCU processor through the decoding matrix for monitoring the voltage output of each of the individual fuel cells.

Theoretically, the above mentioned monitoring system would be effective in practice. However, in case the fuel cell stack to be monitored contains too many fuel cell units or there are several fuel cell stacks needed to be monitored simultaneously, such monitoring device would suffer some unavoidable drawbacks. First of all, the RS485 communicating mode is vulnerable in reliability and inefficient in transmitting speed. Second, as shown in FIG. 1, a plurality of corresponding decoding matrix circuit would be needed for facilitating the operation. Unfortunately, such decoding circuits are rather bulky and not suitable to be used for large scale fuel cell stacks. Third, since there is considerable number of measure lines, the leading wires for such monitoring system would be lengthy. Fourth, the prolonged leading wires are susceptible to be interfered by surrounding environments thus worsening the stability and reliability of the fuel cell stack. Finally, the assembly process of the monitoring system is rather complicated and awesome for common operators.

SUMMARY OF THE PRESENT INVENTION

A main object of the present invention is to provide a monitoring system for a fuel cell stack as well as a huge group integrated fuel cell stacks for instantly diagnosing and alerting an abnormal operational condition thereof in an efficient and reliable way.

Another object of the present invention is to provide a monitoring system for fuel cell stack as well as a huge group of integrated fuel cell stacks for overcoming the above mentioned drawbacks by means of directly measuring the voltage output of each fuel cell unit.

Accordingly, in order to accomplish the above object, the present invention provides a monitoring system for at least a fuel cell stack having a plurality of fuel cell units, comprising:

a central operator electrically connected to the fuel cell stack for administrating an operation of the fuel cell stack; and a monitoring device, comprising:

a plurality of monitoring sensors adapted for electrically connecting to the fuel cell units of the fuel cell stack respectively so as to measure a voltage of each of the fuel cell units; and a MCU (Micro-Chip-Unit), which is electrically connected to the monitoring sensors for sequentially and circularly switching each two neighboring monitoring sensors for reading the voltage of the respective fuel cell unit until the voltage of a last one of said fuel cell units is read, wherein the MCU comprises an A/D converter converting the voltage into a digital message, and a CAN (control area network) bus port allowing a CAN bus electrically coupled to the MCU and the central operator to transmit the digital message to the central operator, wherein the central operator is arranged in such a manner that when the digital message of the respective fuel cell unit is out of a safety range, the central operator generates an alert signal for indicating an abnormal operation of the respective fuel cell unit of the fuel cell stack.

The present invention further provides a method of monitoring at least one fuel cell stack having a plurality of fuel cell units, comprising the steps of:

(a) communicatively connecting a plurality of monitoring sensors to a MCU and the fuel cell units of the fuel cell stack respectively;

(b) sequentially and circularly switching each two neighboring monitoring sensors for reading an voltage of the respective fuel cell unit until the voltage of a last one of the fuel cell units is read so as to collect the voltage of the fuel cell units;

(c) digitally converting and processing the voltage of the fuel cell units via the MCU to obtain a digital message;

(d) transmitting the digital message to a central operator via a CAN bus;

(e) diagnosing the digital message of the fuel cell units, wherein when the voltage value of the respective fuel cell is out of a safety range, said central operator generates an alert signal for indicating an abnormal operation of the respective fuel cell unit of the fuel cell stack.

These and other objectives, features, and advantages of the present invention will become apparent from the following detailed description, the accompanying drawings, and the appended claims.

DETAILED DESCRIPTION OF THE PREFERRED EMBODIMENT

Figure 1:
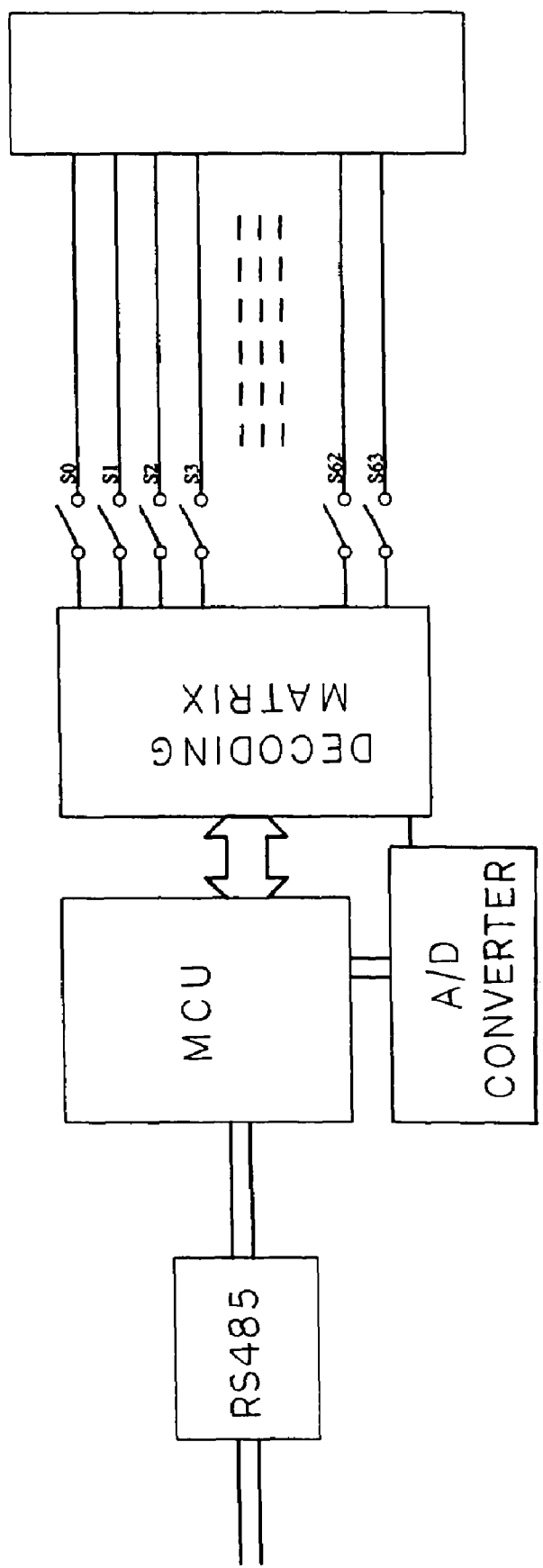
FIG. 1 is a schematic view illustrating a conventional monitoring system for a fuel cell stack.
Figure 2:
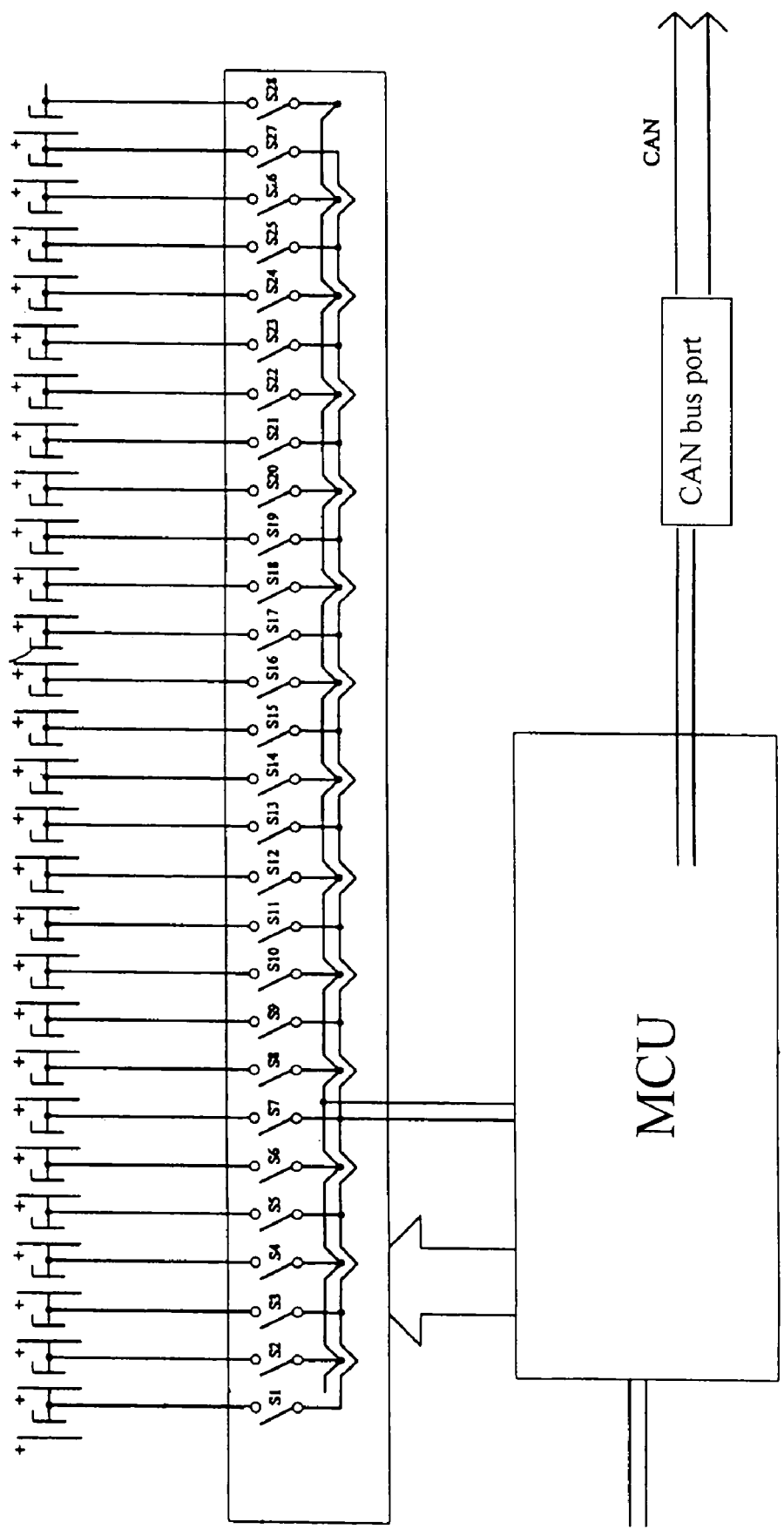
FIG. 2 is a schematic view of a monitoring system for a fuel cell stack according to a preferred embodiment of the present invention.
Figure 5:
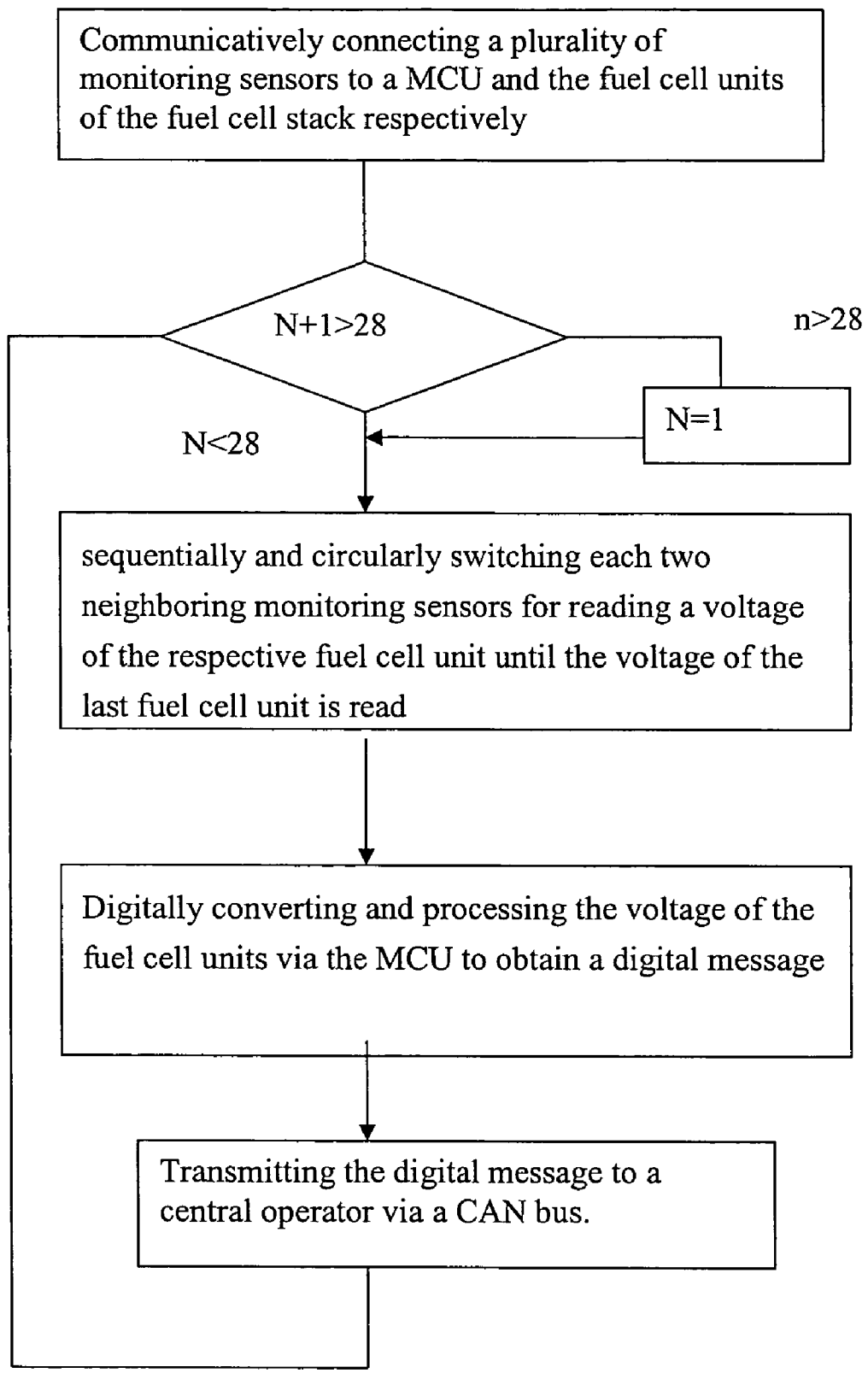
FIG. 5 is a flow chart of a method of monitoring an output voltage of fuel cell units of a fuel cell stack according to the above preferred embodiment of the present invention.

Referring to FIGS. 2 and 5 of the drawings, a monitoring system for monitoring an output voltage of a fuel cell stack 2 having a plurality of fuel cell units (fc1, fc2 . . . ) is illustrated, wherein each of the fuel cell units (fc1, fc2 . . . ) comprises at least an individual fuel cell such that the monitoring system is adapted to monitor the voltage of each individual fuel cell when each fuel cell unit (fc1, fc2 . . . ) contains one single fuel cell or the voltage of fuel cells when each fuel cell unit (fc1, fc2 . . . ) contains two or more fuel cells as a group.

According to the preferred embodiment of the present invention, the monitoring system 1 comprises a monitoring device 10 and a central operator 20.

The central operator 20 is electrically connected to the fuel cell stack 2 for administrating an operation of the fuel cell stack.

The monitoring device 10 comprises a plurality of monitoring sensors (S1, S2 ... S28) adapted for electrically connecting to the fuel cell units (fc1, fc2 ... ) of the fuel cell stack 2 respectively, wherein the monitoring device 10 is adapted for measuring the voltage of each of fuel cell units (fc1, fc2 ... ) when two corresponding neighboring monitoring sensors (S1, S2 ... ) are switched on.

Furthermore, the monitoring device 10 comprises a MCU 11 which is electrically connected to the monitoring device 10 for sequentially and circularly switching each two neighboring monitoring sensors (S1, S2, ... S28) for reading the voltage of the respective fuel cell unit until the last fuel cell unit fc28 is read. Here, the MCU 11 comprises an A/D converter 111 for converting and processing the voltage from the monitoring device 10 into a digitalized voltage value, and a CAN (control area network) bus port defined thereon.

Furthermore, a CAN bus 30 is electrically coupled to the MCU 11 via the CAN bus port and the central operator 20 for transmitting the digitalized voltage value to the central operator 20, wherein the monitoring system is arranged in such a manner that when the voltage value exceeds a safety range, the central operator 20 generates an alert signal for indicating an abnormal operation of the respective fuel cell unit of the fuel cell stack 2.

Here, the MCU 11 is directly connected to the monitoring sensors (S1, S2 ... ) for converting the voltage of each of the fuel cell units (fc1, fc2 ... ) into a digital signal. As a result, the monitoring sensors (S1, S2 ... ) are not connected to the decoding matrix for data converting. Preferably, the MCU 11 is equipped with an A/D converter 111 which is adapted for not only converting the voltage, but also calculatedly processing the voltage of the fuel cell units.

Here, the safety range refers to a voltage output value of a normal fuel cell unit, which is commonly ranging from 0.5–1.2V. In other words, in case once of fuel cell unit is out of order, the output voltage collected by two neighboring monitoring sensor would be lower than 0.5V. As a result, the central operator 20 would indicate an alert signal.

According to the preferred embodiment, the fuel cell stack 2 may comprise twenty-eight fuel cell units (fc1~fc28), wherein twenty-eight monitoring sensors (S1~S28) are then electrically connected to the twenty-eight fuel cell units (fc1~fc28) respectively. In other words, the first two neighboring monitoring sensors S1, S2 are corresponding switched on by the MCU 30 in order to collect the voltage of the first fuel cell unit fc1. Likewise, another two neighboring monitoring sensors S2, S3 are corresponding switched on by the MCU 30 in order to collect the voltage of the second fuel cell unit fc2 such that the voltages from the first fuel cell unit fc1 to the last fuel cell unit fc28 are sequentially collected by the MCU 30 through the monitoring device 10 as a diagnosing loop thereof. It is worth to mention that the MCU 30 programmably activates the monitoring sensors (S1~S63) in an "on" and "off" manner that the preceding monitoring sensor (S1~S28) will be automatically switched off by the MCU 30 when the subsequent monitoring sensor (S1~S28) is switched on such that only two monitoring sensors (S1~S28) are switched on at the same time for reading the voltage of the respective fuel cell unit (fc1~fc28).

Accordingly, the diagnosing loop of the monitoring device 10 can be set to repeatedly perform for a predetermined time period so as to periodically check up whether the fuel cell stack 2 is operating under normal condition. Accordingly, the monitoring sensors S1~S28 are photoelectric isolating relays that the monitoring sensors S1~S28 has no direct relay contact to the fuel cell units (fc1~fc28) and is able to accurately, stably and rapidly measure the output voltages of the fuel cell units (fc1~fc28) while being cost effective.

According to the preferred embodiment of the present invention, the A/D converter 32 is embodied as an Analog-to-Digital converter adapted to collect and convert the voltage of individual fuel cell units (fc1~fc28) from an analog mode into a digital mode for further processing in the alert controller 1.

In practice, the quantity of the fuel cell units (fc1, fc2 ... ) within a fuel cell stack 2 would be of variance. Due to this fact, two or more monitoring devices 10 could be applied for effectively and reliably monitoring the voltage output from respective fuel cell unit of a fuel cell stack.

Figure 3:
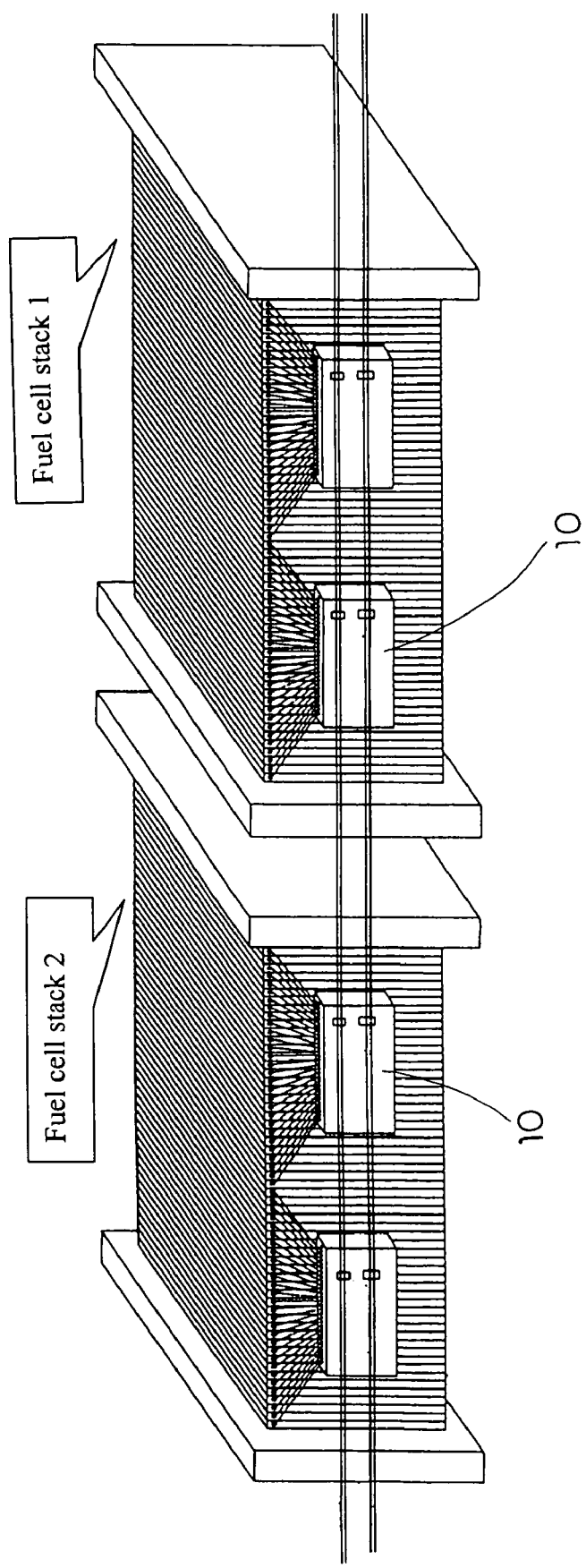
FIG. 3 is a schematic view of the monitoring system utilized in an integrated fuel cell stack according to the preferred embodiment of the present invention.

It is worth to mention that two or more monitoring devices 10 supplemented with CAN bus facility could be functioned together to form an integrated fuel cell voltage-monitoring network as shown in FIG. 3. In such a manner, the central operator 20 is arranged to electrically couple with the integrated fuel cell voltage-monitoring network for monitoring two or more fuel cell stacks at the same time.

Preferably, the MCU 11 is of 87C591 mode and the monitoring sensors (S1, S2 ... ) are embodied as photoelectric relay. It is noted that during the whole voltage monitoring procedure, only two neighboring (adjacent) photoelectric relays would be kept conductible while the remaining photoelectric relays are switched off for guaranteeing a stable operation. In other words, only one fuel cell unit or one set of fuel cell units would be electrically conductible by the MCU 11 during the voltage checking process.

Compared with the prior art, the monitoring system of the preferred embodiment of the present invention is simple to operate, reliable, and accurate. The voltage of each individual fuel cell unit could be directed measured so as to significantly minimize the error possibilities.

According to the preferred embodiment, the voltage digital signal is transmitted via the CAN bus for achieving an efficient transmitting speed. Here, CAN is a multimaster network, which uses CSMA/CD+AMP (Carrier Sense Multiple Access/Collision Detection with Arbitration on Message Priority). Before sending a message, the CAN would check whether the bus is busy and detect the data transferring collision so as to ensure a high-speed data transmission over a short distance. Therefore, once such monitoring devices 10 are equipped with the integrated fuel cell stack assembly via CAN bus connection, one default fuel cell stack would not interrupt the normal operation of the remaining fuel cell stack of the integrated fuel cell stack assembly. Whenever the monitor system is in duty, only two neighboring (adjacent) photoelectric relays would be kept conductible for detecting the voltage of one single fuel cell unit. As a result, the message converting and process load of the MCU would be substantially reduced so that the voltage withstanding requirement of such MCU could be lowered. Moreover, there are no contact points defined on such photoelectric relays, the voltage would be lowered as well, and the conducting speed would be improved so as to enhance the overall reliability and the prolong the operation lifespan of the monitor system.

Figure 4:
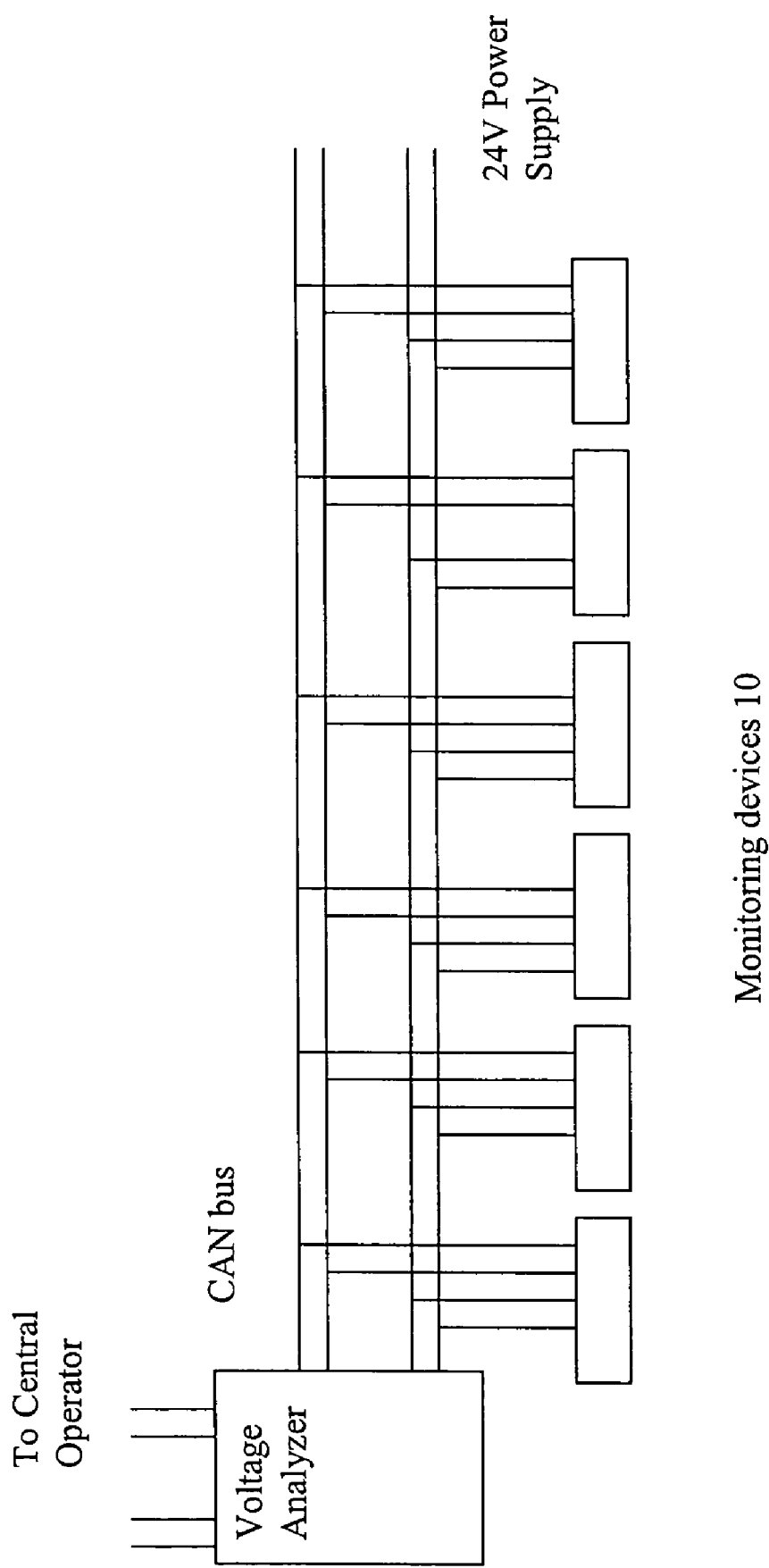
FIG. 4 is a detailed circuit diagram of the monitoring system according to the preferred embodiment of the present invention.

As shown in FIG. 4, since the CAN bus connection was introduced, the volume space reserved for the leading wires and measuring wires of the conventional monitoring device 10 would be saved, so that the monitoring device 10 could be adjacently installed to the fuel cell stack. What is more, for an integrated fuel cell stack assembly, only a CAN bus is required for interconnecting the plurality of fuel cell stacks.

As shown in FIG. 3, the integrated fuel cell stack assembly comprises two fuel cell stack, each of which has two monitoring devices 10 equipped with a CAN bus connection. Therefore, four of such monitoring device 10 are provided for monitoring the pair of fuel cell stacks. In case of one fuel cell unit of such fuel cell stack is detected with an abnormal voltage output, the remaining fuel cell units monitored by other three monitoring devices would not be affected so as to ensure the integrated fuel cell stack assembly operated in a stable and reliable manner.

As shown in FIG. 4, the integrated fuel cell stack assembly comprises eight monitoring devices 10 for ensuring the voltage monitoring process. Furthermore, the monitoring system further comprises a voltage analyzer 40 disposed between the monitoring device 10 and the central operator 20, wherein the digital signal transmitted from the monitoring device 10 is supposed to be screened and coordinated within the voltage analyzer 40 before ultimately transferring to the central operator 20 via the CAN bus.

Referring to FIG. 5, a processing method of such monitoring system 1 according to the preferred embodiment of the present invention is illustrated. The process comprises the following steps:

(a) communicatively connecting a plurality of monitoring sensors to a MCU and the fuel cell units of the fuel cell stack respectively;

(b) sequentially and circularly switching each two neighboring monitoring sensors for reading a voltage of the respective fuel cell unit until the voltage of a last one of the fuel cell units is read so as to collect the voltage of the fuel cell units;

(c) digitally converting and processing the voltage of the fuel cell units via the MCU to obtain a processed voltage value;

(d) transmitting the processed voltage value to an central operator via a CAN bus; and (e) diagnosing the processed voltage value of the fuel cell units, wherein when the voltage value of the respective fuel cell exceeds a safety range, said central operator generates an alert signal for indicating an abnormal operation of the respective fuel cell unit of the fuel cell stack.

Here, the step (a) further comprises a step (a-1) of initiating a base index of the MCU, for example, in case of the fuel cell stack comprises 28 the fuel cell units (fc1, fc2 . . . indexing the first fuel cell unit as n1, and a step (a-2) would be activated for homing the n index value back to zero. Here, the MCU is adapted for sending a signal to control the on-off action of each photoelectric relay.

In the step (b), two neighboring photoelectric relays Kn and Kn-1 would be conducted while the remaining photoelectric relays would be switched off. Therefore, the voltage output of fuel cell unit fcn would be collected by the MCU. Accordingly, the rest collection will be deduced by this analogy until the voltage of the last fuel cell unit fc28 to be collected so as to accomplish the diagnosing loop for the fuel cell stack.

In the step (c), the multi-controller unit (MCU) comprises an A/D converter for converting and digitalizing the voltage into a digital message.

It is worth to mention that in the step (e), when the voltage of the respective fuel cell unit (fc1, fc2. . . ) is within a safety range, another two neighboring monitoring sensors (S1, S2. . . ) are then switched for reading the voltage of the subsequent fuel cell unit (fc1, fc2 . . . ). In other words, in the step (e), when the voltage of the respective fuel cell unit (fc1, fc2 . . . ) exceeds the safety range, the MCU will deactivate the monitoring sensors (S1, S2 . . . ) to stop reading the voltage of the next fuel cell unit (fc1, fc2. . . ), wherein the alert signal will indicate the abnormal operation of the respective fuel cell unit (fc1, fc2 . . . ). Therefore the respective fuel cell unit (fc1, fc2 . . . ) under the abnormal operation can be found.

Alternatively, when the voltage of the respective fuel cell unit (fc1, fc2 . . . ) is within the safety range, the monitoring sensors (S1, S2 . . . ) will keep reading the voltage of the next fuel cell unit (fc1, fc2 . . . ) until all the voltages of the fuel cell unit (fc1, fc2 . . . ) are read, wherein the alert signal will indicate the abnormal operation of the respective fuel cell unit (fc1, fc2 . . . ). Therefore the respective fuel cell unit (fc1, fc2 . . . ) under the abnormal operation can be found.

It is noted in the step (d), in case of two monitoring device 10 of the preferred embodiment of the present invention, once one fuel cell unit monitored by the first monitoring device 10 is detected to be in default function, the voltage monitoring process of fuel cell units monitored by the second monitoring device 20 would not be interrupted. This is due to the fact that the CAN bus is applied for collectively and multi-masterly connecting the monitoring devices 10.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of monitoring at least a fuel cell stack having a plurality of fuel cell units, comprising said steps of:

a) communicatively connecting a plurality of monitoring sensors to a MCU and said fuel cell units of said fuel cell stack respectively, wherein the step (a) further comprises a sub-step of initializing said MCU to activate a diagnosing loop for checking said fuel cell units circularly;

b) sequentially and circularly switching each neighboring pair of said monitoring sensors for reading a voltage of the respective fuel cell unit until said voltage of a last one of said fuel cell unit is read;

c) digitally converting and processing said voltage of said fuel cell units via said MCU to obtain a digital message;

d) transmitting the digital message to a central operator via a CAN bus;

e) diagnosing said digital message of said fuel cell units, wherein when said voltage value of said respective fuel cell exceeds a safety range, said central operator generates an alert signal for indicating an abnormal operation of said respective fuel cell unit of said fuel cell stack.

2. The method as recited in claim 1, wherein in the step (b), said preceding monitoring sensor is automatically switched off when said subsequent monitoring sensor is switched on such that only said neighboring pair of said monitoring sensors are switched on at the same time for reading said voltage of said respective fuel cell unit.

* * * * *